United States Patent
Nyalamadugu et al.

(10) Patent No.: US 10,759,387 B2
(45) Date of Patent: Sep. 1, 2020

(54) SELF-DECLARING ELECTRONIC LICENSE PLATE WITH IMMOBILIZER FEATURES

(71) Applicant: NEOLOGY, INC., San Diego, CA (US)

(72) Inventors: Sheshi Nyalamadugu, San Diego, CA (US); Joe Mullis, Escondido, CA (US); Bobby Leanio, San Diego, CA (US)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 16/702,412

(22) Filed: Dec. 3, 2019

(65) Prior Publication Data

US 2020/0101939 A1 Apr. 2, 2020

Related U.S. Application Data

(62) Division of application No. 15/257,847, filed on Sep. 6, 2016, now Pat. No. 10,632,966.

(Continued)

(51) Int. Cl.
*B60R 25/24* (2013.01)
*G06K 19/077* (2006.01)
(Continued)

(52) U.S. Cl.
CPC .............. *B60R 25/24* (2013.01); *B60R 25/10* (2013.01); *G06K 7/10009* (2013.01);
(Continued)

(58) Field of Classification Search
CPC .... B60R 25/24; B60R 25/10; G06K 19/0723; G06K 19/0772
(Continued)

(56) References Cited

U.S. PATENT DOCUMENTS

| | | |
|---|---|---|
| 7,081,819 B2 | 7/2006 | Martinez de Velasco Cortina et al. |
| 7,091,860 B2 | 8/2006 | Martinez de Velasco Cortina et al. |

(Continued)

OTHER PUBLICATIONS

International Search Report for PCT International Application No. PCT/US2016/050450 dated Dec. 2, 2016, 19 pages.

(Continued)

*Primary Examiner* — Kam Wan Ma
(74) *Attorney, Agent, or Firm* — Procopio, Cory, Hargreaves & Savitch LLP; Mark W. Catanese

(57) ABSTRACT

A self-declaring electronic license plate (e-plate) system for a vehicle is disclosed. This self-declaring e-plate system includes: an input device; a radio frequency identification (RFID) reader coupled to the input device; and an RFID-enabled license plate. In some embodiments, the input device is configured to receive vehicle occupancy information and triggers the RFID reader to write the received vehicle occupancy information to the RFID-enabled license plate in response to receiving the vehicle occupancy information. The RFID reader is configured to write at least a portion of the received vehicle occupancy information to the RFID-enabled license plate. The RFID-enabled license plate is configured to provide at least a portion of the received vehicle occupancy information to an electronic toll collection (ETC) reader. In some embodiments, the received vehicle occupancy information includes a current number of occupants self-declared by a user, such as a driver or a passenger inside the vehicle.

25 Claims, 6 Drawing Sheets

Related U.S. Application Data

(60) Provisional application No. 62/214,166, filed on Sep. 3, 2015, provisional application No. 62/214,173, filed on Sep. 3, 2015.

(51) Int. Cl.
    *G06K 19/07* (2006.01)
    *G06K 7/10* (2006.01)
    *B60R 25/10* (2013.01)

(52) U.S. Cl.
    CPC ..... *G06K 19/0716* (2013.01); *G06K 19/0723* (2013.01); *G06K 19/0772* (2013.01); *G06K 19/07749* (2013.01); *G06K 19/07786* (2013.01); *B60R 2025/1013* (2013.01)

(58) Field of Classification Search
    USPC .................................................... 340/426.11
    See application file for complete search history.

(56) References Cited

U.S. PATENT DOCUMENTS

| | | | |
|---|---|---|---|
| 7,388,501 B2 * | 6/2008 | Tang | G06K 7/10346 340/10.1 |
| 7,671,746 B2 | 3/2010 | Martinez de Velasco Cortina et al. | |
| 8,237,568 B2 | 8/2012 | Martinez de Velasco Cortina et al. | |
| 8,321,264 B2 | 11/2012 | Goldmann et al. | |
| 8,344,886 B2 * | 1/2013 | Gravelle | H04Q 9/00 340/572.1 |
| 8,587,435 B2 | 11/2013 | Nguyen | |
| 8,754,751 B1 * | 6/2014 | Picolli | G01S 13/785 340/10.1 |
| 10,019,706 B2 * | 7/2018 | Geist | G08G 1/017 |
| 2002/0021210 A1 | 2/2002 | Naddeo | |
| 2005/0179563 A1 * | 8/2005 | Kelley | G08G 1/01 340/928 |
| 2006/0015394 A1 * | 1/2006 | Sorensen | G06Q 40/00 705/13 |
| 2008/0042848 A1 | 2/2008 | Roberts et al. | |
| 2010/0026465 A1 * | 2/2010 | Gravelle | G06K 19/07749 340/10.1 |
| 2010/0106567 A1 * | 4/2010 | McNew | G06Q 30/04 705/13 |
| 2010/0161392 A1 * | 6/2010 | Ashby | G06O 30/0284 705/13 |
| 2012/0143786 A1 * | 6/2012 | Karner | G06Q 30/0283 705/400 |
| 2012/0194330 A1 | 8/2012 | Nguyen | |
| 2013/0278768 A1 * | 10/2013 | Paul | G08G 1/0175 348/148 |
| 2015/0048159 A1 | 2/2015 | Martinez de Velasco Cortina et al. | |
| 2015/0169912 A1 | 6/2015 | Martinez de Velasco Cortina et al. | |
| 2016/0314452 A1 | 10/2016 | Pochic et al. | |
| 2016/0342883 A1 | 11/2016 | Huhtasalo | |

OTHER PUBLICATIONS

Extended European Search Report for Application No. EP16843203.7 dated Jan. 22, 2019 (7 pages).

* cited by examiner

SELF-DECLARING ELECTRONIC LICENSE PLATE WITH IMMOBILIZER FEATURES

PRIORITY CLAIM AND RELATED PATENT APPLICATIONS

This patent document is a divisional of U.S. application Ser. No. 15/257,847 entitled "SELF-DECLARING ELECTRONIC LICENSE PLATE WITH IMMOBILIZER FEATURES" and filed Sep. 6, 2016 which in turn claims benefit of priority under 35 U.S.C. 119(e) to U.S. Patent Application No. 62/214,166 entitled "SWITCHABLE ELECTRONIC LICENSE PLATE" and to U.S. Patent Application No. 62/214,173 entitled "ELECTRONIC LICENSE PLATE WITH IMMOBILIZER FEATURE," both of which were filed on Sep. 3, 2015. The disclosures of the above applications are incorporated by reference in their entirety as a part of this document.

BACKGROUND

1. Technical Field

The various embodiments described herein are related to wireless devices, and more particularly to a self-declaring electronic license plate (e-plate) which can be used to immobilize a vehicle.

2. Related Art

Radio frequency identification (RFID) technology harnesses electromagnetic fields to transfer data wirelessly. One of the primary uses for RFID technology is the automatic identification and tracking of objects via RFID tags, which can be attached or incorporated into a variety of objects. Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an RFID tag can be used for the purposes of electronic toll collection (ETC), electronic vehicle registration (EVR), and border crossing, among others.

ETC systems often rely on RFID transponders installed on vehicles to identify the vehicles and to apply toll charges. For example, when crossing a toll plaza, an RFID transponder on a vehicle can communicate with an RFID reader at the toll plaza to provide vehicle identification information (e.g., one or more identifiers) that allows the ETC system to identify and debit a toll account associated with the vehicle.

While some types of RFID transponders may be carried inside a vehicle (e.g., on the windshield), a growing number of RFID transponders are integrated into vehicle's license plates (referred to as "RFID-enabled license plates" or simply "e-plates"). Because RFID-enabled license plates are typically secured to the exterior of a vehicle, such license plates are particularly susceptible to theft. However, conventional RFID-enabled license plates do not provide security mechanisms that could prevent misuse of stolen plates and discourage theft.

Moreover, in various ETC applications, while tolling authorities may impose a fixed toll rate for some roads, bridges, and tunnels, it becomes increasingly common to encounter transportation channels where the applicable toll is determined based on vehicle occupancy. Conventional occupancy-based ETC systems rely on switchable RFID transponders, which are commonly attached to a vehicle's windshield inside the vehicle. A driver would manually select one of the available modes representing different occupancies on the switchable RFID transponder in order to transmit the current occupancy information (i.e., the number of occupants inside the vehicle) to an ETC reader. However, these conventional switchable RFID transponders provide a limited number of modes and can thus transmit only a limited number of possible occupancy scenarios.

SUMMARY

Embodiments described herein provide various examples of a self-declaration electronic license plate system implemented on a vehicle operable to provide current vehicle occupancy information to an electronic toll collection (ETC) reader.

According to one aspect, a self-declaring electronic license plate (e-plate) system for a vehicle is disclosed. This self-declaring e-plate system includes: an input device; a radio frequency identification (RFID) reader coupled to the input device; and an RFID-enabled license plate. In some embodiments, the input device is configured to receive vehicle occupancy information and triggers the RFID reader to write the received vehicle occupancy information to the RFID-enabled license plate in response to receiving the vehicle occupancy information. The RFID reader is configured to write at least a portion of the received vehicle occupancy information to the RFID-enabled license plate. The RFID-enabled license plate is configured to provide at least a portion of the received vehicle occupancy information to an electronic toll collection (ETC) reader. In some embodiments, the received vehicle occupancy information includes a number of occupants inside the vehicle self-declared by a user, such as a driver or a passenger inside the vehicle.

In some embodiments, the RFID-enabled license plate further includes a first RFID module configured to operate using a first frequency band and a second RFID module configured to operate using a second frequency band. The RFID-enabled license plate can communicate with the RFID reader via the first RFID module using the first frequency band, such as a high frequency (HF) frequency band. The RFID-enabled license plate can communicate with the ETC reader via the second RFID module using the second frequency band, such as an ultra-high frequency (UHF) frequency band.

In some embodiments, the input device includes a keypad which is configured to receive the vehicle occupancy information directly from a user. In other embodiments, the input device is integrated with an onboard computer system and is configured to receive the vehicle occupancy information input by a user via a user interface of the onboard computer system.

In some embodiments, the RFID-enabled license plate is further configured to store account information for a toll account associated with a vehicle. The RFID-enabled license plate can provide at least a portion of the account information to the ETC reader. The ETC reader can identify the toll account associated with the vehicle based on the received account information, and debit a toll charge determined based on the received vehicle occupancy information.

In some embodiments, at least one of the writing of the received occupancy information to the RFID-enabled license plate and the provision of the received occupancy information to the ETC reader by the RFID-enabled license plate includes gaining access to a memory of the RFID-enabled license plate based on one or more security keys.

In some embodiments, the RFID reader is a multi-purpose RFID reader which can perform one or more functions other than writing to the RFID-enabled license plate. For example, the RFID reader can also be configured to lock and unlock the vehicle. In other embodiments, the RFID reader is a dedicated RFID reader configured specifically for communicating with the RFID-enabled license plate.

In a further aspect, a process for providing vehicle occupancy information to an ETC reader is disclosed. This process starts by receiving, at an input device, current occupancy information for a vehicle. Next, the process uses a radio frequency identification (RFID) reader to write the received current occupancy information to an RFID-enabled license plate. The process can then provide the current occupancy information from the RFID-enabled license plate to an ETC reader on demand.

In yet another aspect, an e-plate system on a vehicle capable of automatic license plate validation is disclosed. This e-plate system includes: an RFID-enabled license plate configured to store one or more identifiers; an RFID reader configured to interrogate the RFID-enabled license plate; and an onboard microcontroller coupled to the RFID reader. This onboard microcontroller is further configured to: determine whether the RFID-enabled license plate is present on the vehicle based at least on a result of interrogation of the RFID-enabled license plate received from the RFID reader; in response to determining that the RFID-enabled license plate is present on the vehicle, determine whether the RFID-enabled license plate is a valid license plate for the vehicle based at least on the one or more identifiers stored on the RFID-enabled license plate; and in response to determining that the RFID-enabled license plate is not a valid license plate for the vehicle, enable one or more vehicle functions.

In some embodiments, if the RFID reader is able to successfully interrogate the RFID-enabled license plate, the RFID reader is configured to receive, from the RFID-enabled license plate, the one or more identifiers stored on the RFID-enabled license plate. However, if the RFID reader is unable to successfully interrogate the RFID-enabled license plate, the RFID reader is further configured to transmit a signal to the onboard microcontroller indicating that the RFID-enabled license plate is not present on the vehicle.

In still another aspect, a process for automatically validating an RFID-enabled license plate on a vehicle is disclosed. This process starts by interrogating the RFID-enabled license plate to determine whether the RFID-enabled license plate is present on the vehicle. The interrogation can be performed periodically or based on a dynamic or fixed schedule. If it is determined that the RFID-enabled license plate is present on the vehicle, the process then receives one or more identifiers from the RFID-enabled license plate. Next, the process determines whether the RFID-enabled license plate is a valid license plate for the vehicle by comparing the one or more received identifiers with one or more stored identifiers corresponding to the valid license plate. In response to determining that the RFID-enabled license plate is not a valid license plate for the vehicle, the process enables one or more vehicle functions, such as enabling an immobilizer function to prevent the vehicle from starting and/or setting off an alarm siren of the vehicle.

Other features and advantages of the present disclosure should be apparent from the following description which illustrates by way of example aspects of the present disclosure.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
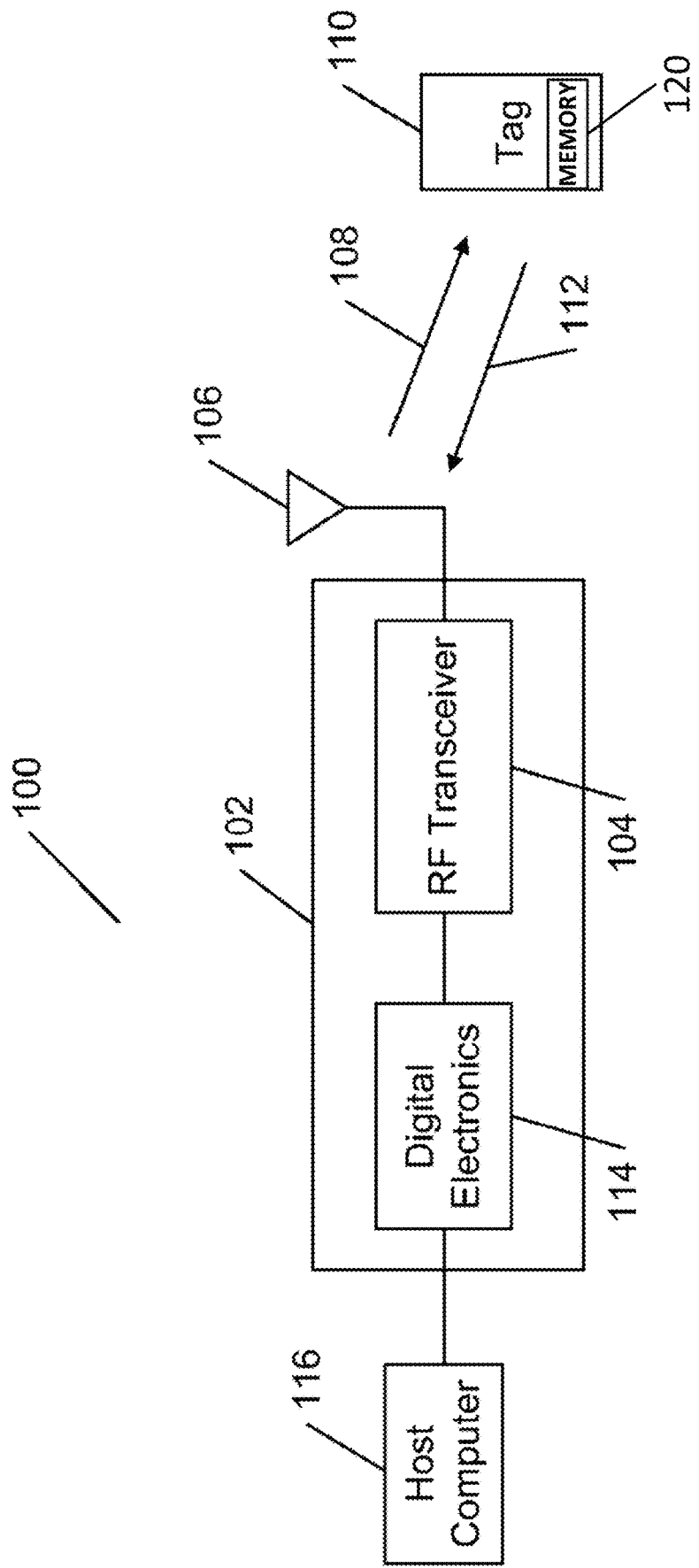
FIG. 1 shows a diagram illustrating an exemplary RFID system in accordance with one embodiment described herein.

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Embodiments described herein provide various examples of a self-declaration electronic license plate system implemented on a vehicle operable to provide current vehicle occupancy information to an electronic toll collection (ETC) reader.

According to one aspect, a self-declaring electronic license plate (e-plate) system for a vehicle is disclosed. This self-declaring e-plate system includes: an input device; a radio frequency identification (RFID) reader coupled to the input device; and an RFID-enabled license plate. In some embodiments, the input device is configured to receive vehicle occupancy information and triggers the RFID reader to write the received vehicle occupancy information to the RFID-enabled license plate in response to receiving the vehicle occupancy information. The RFID reader is configured to write at least a portion of the received vehicle occupancy information to the RFID-enabled license plate. The RFID-enabled license plate is configured to provide at least a portion of the received vehicle occupancy information to the ETC reader. In some embodiments, the received vehicle occupancy information includes a number of occupants inside the vehicle self-declared by a user, such as a driver or a passenger inside the vehicle.

In a further aspect, a process for providing vehicle occupancy information to an ETC reader is disclosed. This process starts by receiving, at an input device, current occupancy information for a vehicle. Next, the process uses a RFID reader to write the received current occupancy information to an RFID-enabled license plate. The process can then provide the current occupancy information from the RFID-enabled license plate to an ETC reader on demand.

In yet another aspect, an e-plate system on a vehicle capable of automatic license plate validation is disclosed. This e-plate system includes: an RFID-enabled license plate configured to store one or more identifiers; an RFID reader configured to interrogate the RFID-enabled license plate; and an onboard microcontroller coupled to the RFID reader. This onboard microcontroller is further configured to: determine whether the RFID-enabled license plate is present on the vehicle based at least on a result of interrogation of the RFID-enabled license plate received from the RFID reader; in response to determining that the RFID-enabled license plate is present on the vehicle, determine whether the RFID-enabled license plate is a valid license plate for the vehicle based at least on the one or more identifiers stored on the RFID-enabled license plate; and in response to determining that the RFID-enabled license plate is not a valid license plate for the vehicle, enable one or more vehicle functions.

In still another aspect, a process for automatically validating an RFID-enabled license plate on a vehicle is disclosed. This process starts by interrogating the RFID-enabled license plate to determine whether the RFID-enabled license plate is present on the vehicle. The interrogation can be performed periodically or based on a dynamic or fixed schedule. If it is determined that the RFID-enabled license plate is present on the vehicle, the process then receives one or more identifiers from the RFID-enabled license plate. Next, the process determines whether the RFID-enabled license plate is a valid license plate for the vehicle by comparing the one or more received identifiers with one or more stored identifiers corresponding to the valid license plate. In response to determining that the RFID-enabled license plate is not a valid license plate for the vehicle, the process enables one or more vehicle functions, such as enabling an immobilizer function to prevent the vehicle from starting and/or setting off an alarm siren of the vehicle.

FIG. 1 shows a diagram illustrating an exemplary RFID system 100 in accordance with one embodiment described herein. In system 100, RFID interrogator/reader 102 communicates with one or more RFID tags 110. Data can be exchanged between interrogator/reader 102 and RFID tag 110 via radio transmit signal 108 and radio receive signal 112. RFID interrogator/reader 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110. RFID tag 110 can includes a memory 120 to store tag information and/or application-specific data. Data stored on memory 120 can be read by RFID interrogator/reader 102 through radio transit signal 108. Moreover, memory 120 can be written and/or updated by RFID interrogator/reader 102 with data embedded in radio transit signal 108.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. In some embodiments, RFID tag 110 and RFID interrogator/reader 102 are not in a fixed configuration, for example, RFID tag 110 can be installed on a vehicle while RFID interrogator/reader 102 is installed near a toll booth and. In these embodiments, when RFID tag 110 passes within the range of the radio frequency magnetic field emitted by antenna 106 of RFID interrogator/reader 102, RFID tag 110 is excited and transmits data back to RF interrogator/reader 102. In other embodiments, RFID tag 110 and RFID interrogator/reader 102 are in a fixed configuration, for example, both RFID tag 110 and RFID interrogator/reader 102 can be installed on the same vehicle. In these embodiments, RFID tag 110 can be excited and transmit data back to RF interrogator/reader 102 when RFID interrogator/reader 102 is activated and begins to emit radio transit signal 108 through antenna 106. Alternatively, RFID tag 110 can be excited and allow data to be written into memory 120 when RFID interrogator/reader 102 is activated and begins to transmit data embedded in radio transit signal 108 through antenna 106.

In some implementations, in response to radio transit signal 108 transmitted by RF interrogator/reader 102 to access data stored on memory 120 of RFID tag 110, a change in the impedance of RFID tag 110 can be used to signal the data to RF interrogator/reader 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator/reader 102 facilitates the reading or writing of data to RFID tags, e.g. RFID tag 110 that are within range of the RF field emitted by antenna 104. Together, RF transceiver 104 and digital electronics 114 comprise RF interrogator/reader 102. Finally, digital electronics 114 and can be interfaced with an integral display and/or provide a parallel or serial communications interface to a host computer or industrial controller, e.g. host computer 116.

In some embodiments, an RFID transponder (e.g., RFID tag 110 described with respect to FIG. 1) can be embedded in a vehicle's license plate to form an RFID-enabled license plate. However, vehicle license plates are most commonly made from metal (e.g., aluminum). Direct and uninsulated contact between an RFID transponder (single or multi-frequency) and a metal license plate (e.g., by applying the transponder directly onto the metal license plate) can short or severely detune the transponder's antenna(s), rendering the transponder virtually unreadable. Thus, in the exemplary embodiments described in more detail below, a transponder is embedded in a metal license plate in ways that neither compromise the performance of the transponder's antenna (s) nor add undesirable bulk to the license plate's usual dimensions. In some exemplary embodiments, an RFID-enabled license plate is configured to resonate at multiple frequencies (e.g., HF and UHF bands). In some embodiments, a resonator for the transponder is formed from the license plate itself if the license plate is metal. In other embodiments, whether the plate is metal or non-metal, the resonator can also be formed from a metalized layer (e.g., retro-reflective material, holographic foil, or any other appropriate metallic substrate) covering the license plate.

Figure 2:
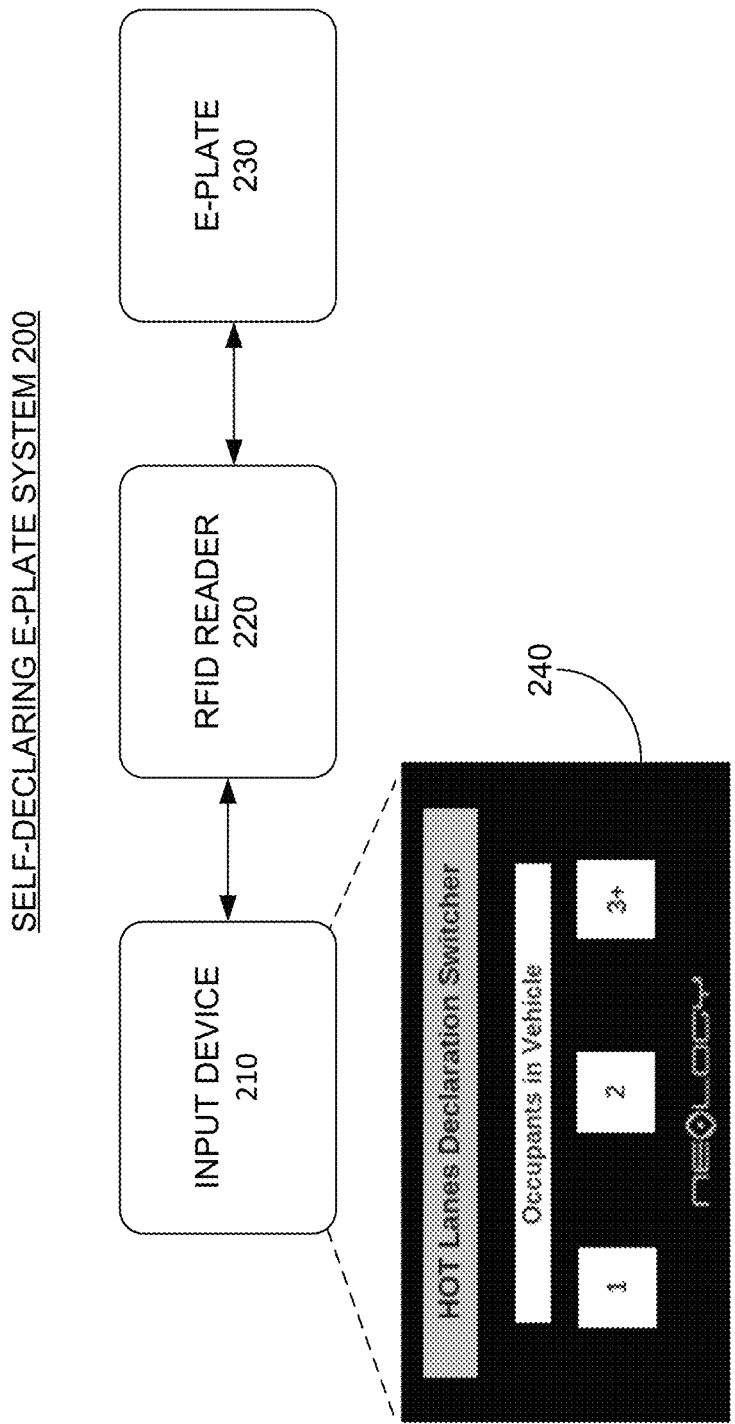
FIG. 2 shows a block diagram of an exemplary self-declaring electronic license plate system in accordance with one embodiment described herein.

FIG. 2 shows a block diagram of an exemplary self-declaring electronic license plate (or "e-plate" hereinafter) system 200 in accordance with one embodiment described herein. As can be seen in FIG. 2, self-declaring e-plate system 200 includes at least an input device 210, an RFID reader 220, and an e-plate 230, which are coupled to each other by wired connections, wireless connections, or a combination of both.

In various embodiments, input device 210 includes a user-interface which is configured to receive a user "self-declaration" input that includes current occupancy information for a vehicle. For example, the current occupancy information can include a number of occupants inside the vehicle. Hence, in various embodiments, a user such as a driver or a passenger of the vehicle uses input device 210 to make a self-declaration to an ETC system of a number of occupants inside the vehicle. In various embodiments, input device 210 can also include or be coupled to a display or a graphic user interface (GUI) for displaying a wide range of options of occupancy information for selection. Hence, the disclosed user self-declaration input can include either a direct user input of a current number of occupants or a user selection from the wide range of options shown on the display. For example, input device 210 can include a GUI 240 in the form of a touchscreen that displays a high occupancy vehicle (HOV) lane self-declaration switch. Using GUI 240, a vehicle occupant (e.g., a driver or a passenger) can select a number of vehicle occupants by touching one of the three occupancy options: 1, 2, and 3+. Although the example of GUI 240 only shows three occupancy options for user selection, other embodiments of a GUI within input device 210 can display additional selection options for the vehicle occupancy.

In some embodiments, input device 210 includes an external keypad which is configured to receive user inputs (e.g., occupancy information) directly from a user (e.g., a driver or a passenger of the vehicle). In some other embodiments, input device 210 is integrated with an onboard computer system of a vehicle. The onboard computer system can provide one or more input functions including, for example, but not limited to, a keyboard or a touch panel. As such, input device 210 can receive direct user inputs of the occupancy information and/or a user selection of the occupancy information from the user via the onboard computer system. Comparing to a switchable RFID transponder that offers only a few fixed selections for the occupancy information, the disclosed self-declaring e-plate system allows for a significantly greater flexibility and accuracy in stating and providing occupancy information of a vehicle to the ETC systems.

According to one exemplary embodiment, in response to receiving one or more inputs including occupancy information from a user, input device 210 is configured to trigger RFID reader 220 to perform a write operation to e-plate 230. For example, input device 210 can include an integrated circuit (IC) chip or a microprocessor (now shown) coupled between the user interface of the input device 210 and RFID reader 220. After receiving user inputs entered through the user interface, this IC chip or microprocessor transmits the user inputs including the occupancy information to RFID reader 220, which then triggers RFID reader 220 to perform the write operation to e-plate 230. Alternatively, if input device 210 is integrated with an onboard computer system of a vehicle, the onboard computer system, when receiving user inputs from input device 210, transmits the user inputs including the occupancy information to RFID reader 220, which then triggers RFID reader 220 to perform the write operation to e-plate 230. In various embodiments, RFID reader 220 can be triggered to write and/or update at least a portion of the input information (e.g., occupancy information) received at input device 210 to e-plate 230.

In various embodiments, when RFID reader 220 and e-plate 230 are installed on a vehicle, RFID reader 220 is positioned on the vehicle at a location within an effective read/write range of the RFID tag within e-plate 230. Notably, if the RFID tag within e-plate 230 is based on an UHF transmission scheme, the effective read/write range is typically longer than 3 feet and up to 37 feet. In various embodiments, RFID reader 220 can be a multi-purpose RFID reader which can perform other RFID read functions such as for locking and unlocking the vehicle. In other embodiments, RFID reader 220 is a dedicated RFID reader configured specifically for the function of the self-declaring e-plate system 200. In some embodiments, RFID reader 220 can be implemented according to RF reader 102 described with respect to FIG. 1.

In various embodiments, e-plate 230 is an RFID-enabled license plate that includes an RFID transponder/tag which further includes a memory. According to one exemplary embodiment, one portion of the memory stores account information for an electronic toll account associated with the vehicle while another portion of the memory stores current occupancy information for the vehicle. In some embodiments, e-plate 230 is configured to communicate with an ETC reader (not shown). In these embodiments, the ETC reader is configured to access at least a portion of the account information and the current occupancy information stored in the memory of e-plate 230. In one exemplary embodiment, a toll charge that is assessed based on the current occupancy information can be debited from the toll account associated with the vehicle through the communication between e-plate 230 and the ETC reader.

Various embodiments of an RFID-enabled license plate are described in U.S. Pat. Nos. 8,344,890 and 9,007,215, the disclosures of which are incorporated by reference herein in their entirety.

According to one exemplary embodiment, access to the memory of e-plate 230 can be granted based on a security key. The provision of secure identification solutions is described in U.S. Pat. Nos. 7,081,819, 7,671,746, 8,237,568, 8,322,044, and 8,004,410, the disclosures of which are incorporated by reference herein in their respective entirety. For example, in various embodiments, RFID reader 220 and/or ETC readers can gain access to account and/or occupancy information stored in the memory of e-plate 230 based on one or more security keys.

In some embodiments, e-plate 230 includes two or more RFID modules configured to interface with corresponding RFID systems at different frequencies. Alternatively, e-plate 230 can include a multi-frequency RFID tag configured to interface with multiple RFID systems at different frequencies. Multi-frequency RFID tags are described in Reissued U.S. Pat. Nos. RE 43,355 and RE 44,691, the disclosures of which are incorporated by reference herein in their respective entirety. For example, in one exemplary embodiment, e-plate 230 is configured to communicate with the RFID reader 220 using a high frequency (HF) band (e.g., 13.56 megahertz (MHz)) and communicate with an ETC reader using an ultra-high frequency (UHF) band (e.g., 915 MHz or 2.45 gigahertz (GHz)).

In some embodiments, e-plate 230 can be further configured to perform one or more account management functions. According to one exemplary embodiment, e-plate 230 operates at one frequency (e.g., HF) to interact with an electronic payment system and at a different frequency to interact with an ETC system. For example, e-plate 230 can interact with a near-field communication (NFC)-enabled device at a HF band to provide sufficient information for the NFC-enabled device to complete an electronic payment transaction to replenish a toll account. In addition, e-plate 230 can interact with an ETC reader to provide sufficient information for the ETC system to apply a toll charge to the toll account. Various account management applications for e-plate 230 are described in U.S. Pat. No. 14/459,299 and U.S. patent application Ser. No. 14/459,299, the disclosures of which are incorporated herein by reference in their entirety.

A person having ordinary skill in the art can appreciate that input device 210, RFID reader 220, and e-plate 230 can be coupled via wired and/or wireless connections. As such, in various embodiments, input device 210, RFID reader 220, and e-plate 230 can be installed at separate locations on a vehicle. For example, input device 210 and/or RFID reader 220 can be installed inside the cabin of the vehicle while e-plate 230 is placed on the exterior of the vehicle. In some embodiments, input device 210 and RFID reader 220 are integrated as a single electronic module, for example, as a single System on Chip (SoC). In some embodiments, input device 210 and RFID reader 220 are integrated into a single package inside a protective case. This single package containing input device 210 and RFID reader 220 can be placed inside the vehicle at a fixed location, such as on the windshield, on or above the dashboard, on a door panel, on the back of a seat, etc. However, a single package containing input device 210 and RFID reader 220 can also be configured as a portable device which can be handheld and operated by a driver or a passenger of the vehicle.

Figure 3:
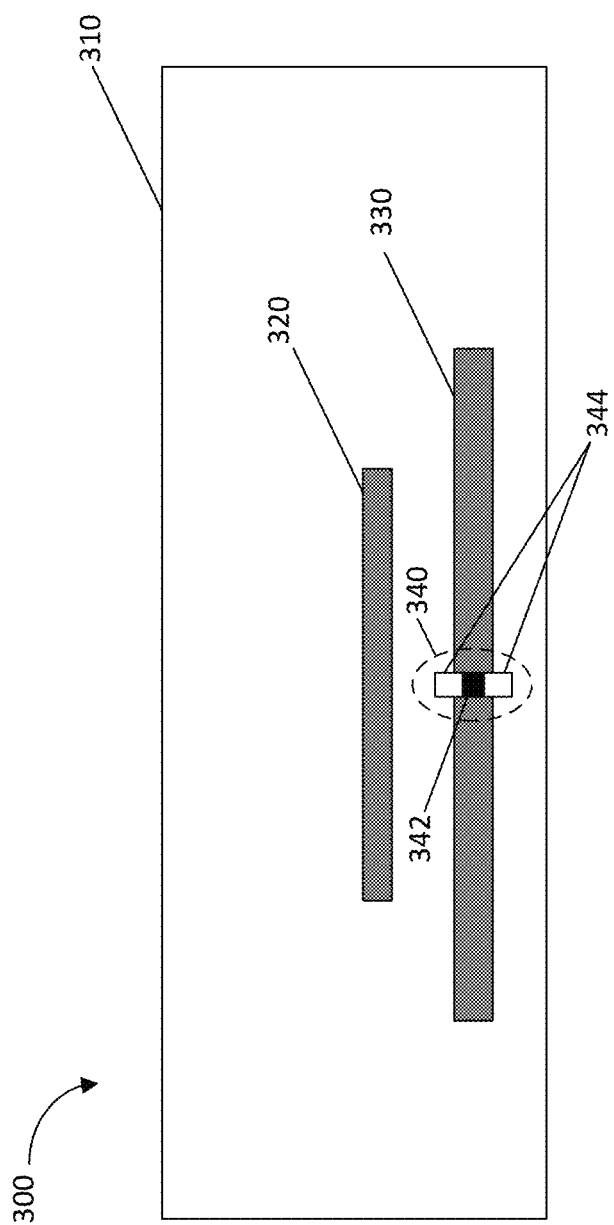
FIG. 3 illustrates the top view of an RFID-enabled license plate in accordance with one embodiment described herein.

FIG. 3 illustrates the top view of an RFID-enabled license plate 300 in accordance with one embodiment described herein. RFID-enabled license plate 300 provides one implementation of e-plate 230 described in conjunction with FIG. 2.

As can be seen in FIG. 3, RFID-enabled license plate 300 includes a metal plate 310. In various embodiments, RFID-enabled license plate 300 can be configured to include one or more slots, which are open areas that are cut or punched out of plate 310. In some embodiments, RFID-enabled license plate 300 can be configured to include multiple slots. As shown in FIG. 3, RFID-enabled license plate 300 includes a first slot 320 and a second slot 330. In various embodiments, both the first slot 320 and the second slot 330 can be filled with a non-metal material. In some embodiments, the non-metal material can be stuffed, extruded, or otherwise deposited into slot 320 and slot 330. In various embodiments, the non-metal material remains flush with respect to both the front and rear surfaces of plate 300.

Furthermore, as shown in FIG. 3, an RFID strap 340 can be positioned across the second slot 330 as illustrated. In the embodiment shown, RFID strap 340 includes an RFID chip 342 as well as one or more contacts 344 that are connected to or capacitively coupled with plate 310. In some embodiments, RFID strap 340 and a slot antenna formed from plate 310 form the main components of an RFID transponder of RFID-enabled license plate 300. In various embodiments, the respective and relative dimensions, spacing, and location of slots 320 and 330 are configured such that the slot antenna formed from plate 310, slot 320, and slot 330 will resonate at multiple desired frequencies. In various embodiments, the slot antenna configured according to FIG. 3 is able to resonate at both an HF band (e.g., 13.56 MHz) and a UHF (e.g., 915 MHz) band. Furthermore, RFID chip 342 can be configured to operate at these multiple desired frequencies. As a result, RFID-enabled license plate 300 includes a multi-frequency RFID transponder that allows RFID-enabled license plate 300 to interface with multiple RFID systems, including, but not limited to, RFID reader 220, a NFC communication device, and one or more ETC systems which can operate at different frequencies.

In other embodiments, instead of using multiple slots (e.g., slot 320 and slot 330) configured to resonate at several different frequencies, a RFID-enabled license plate can also include just a single slot configured to resonate at a single frequency. In these embodiments, RFID-enabled license plate 300 includes a single frequency RFID transponder that allows RFID-enabled license plate 300 to interface with RFID reader 220 and one or more ETC systems which operate at the same frequency band.

Some applications (e.g., vehicle registration) can require a placement of metallic material (e.g., retro-reflective material, holographic image) over RFID-enabled license plate 300. In order to preserve the transmission and reception capabilities of RFID-enabled license plate 300, a selective de-metallization process can be employed to treat the metallic material. Selective de-metallization is described in U.S. Pat. Nos. 7,034,688 and 7,463,154, the disclosures of which are incorporated by reference herein in their respective entirety.

Figure 4:
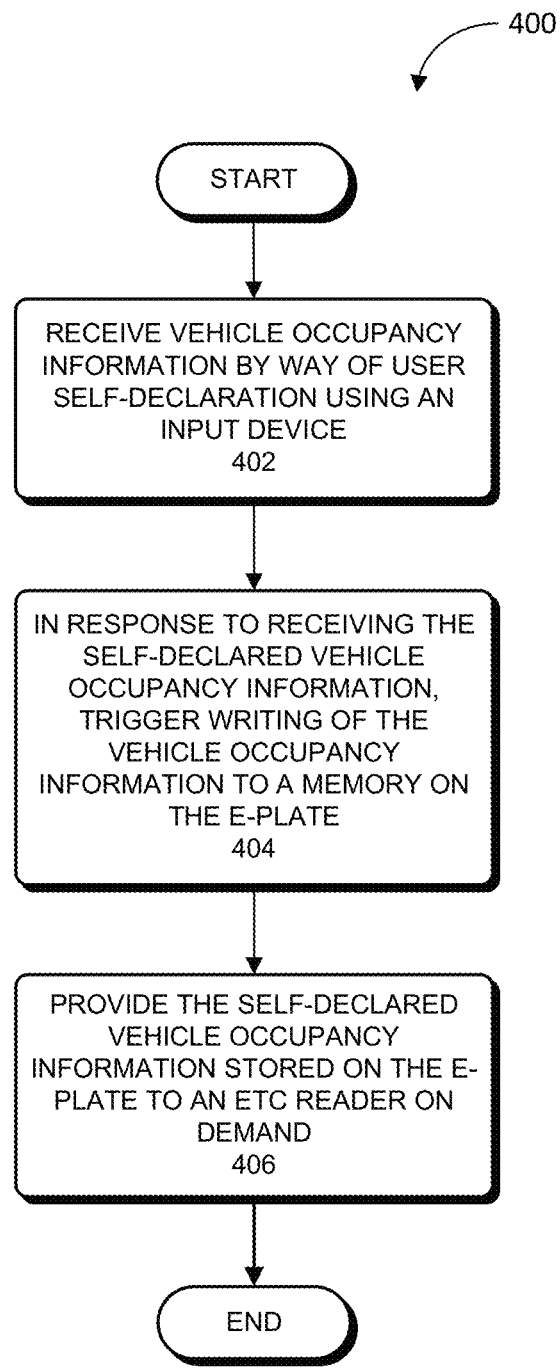
FIG. 4 presents a flowchart illustrating a process for providing self-declared vehicle occupancy information to an ETC reader using the self-declaring e-plate system in accordance with one embodiment described herein.

FIG. 4 presents a flowchart illustrating a process 400 for providing self-declared vehicle occupancy information to an ETC reader using the self-declaring e-plate system 200 described in FIG. 2 in accordance with one embodiment described herein.

To begin, self-declaring e-plate system 200 receives vehicle occupancy information by way of user self-declaration from an input device (step 302). For example, a user (e.g., a driver or a passenger) can enter or select a number of occupants in a vehicle using a keypad on input device 210 or an input unit (e.g., a keyboard or a touch panel) on an onboard computer system that is integrated with input device 210. As such, in various embodiments, e-plate system 200 directly receives vehicle occupancy information from a driver or a passenger of the vehicle via the keypad on the input device 110 or. Alternatively, input device 210 of e-plate system 200 can receive vehicle occupancy information from a keyboard or a touch panel on an onboard computer system integrated with input device 210. In some embodiments, input device 210 is implemented as a function module of the onboard computer system.

Next, in response to receiving the vehicle occupancy information, input device 210 triggers RFID reader 220 of the self-declaring e-plate system 200 to write at least a portion of the received vehicle occupancy information to e-plate 230 (step 304). According to one exemplary embodiment, e-plate 230 includes an RFID transponder/tag which further includes a memory, wherein one portion of the memory stores account information for an electronic toll account associated with the vehicle while another portion of the memory stores current occupancy information for the vehicle. In some embodiments, RFID reader 220 can both write to and read from the memory of the RFID transponder/ tag on e-plate 230. Furthermore, RFID reader 220 can gain access to the memory on e-plate 130 based on one or more security keys.

After storing the self-declared vehicle occupancy information into the memory of e-plate 230, e-plate system 300 is configured to provide the self-declared vehicle occupancy information to an ETC reader on demand (step 306). For example, the memory of e-plate 230 can be accessed by an ETC reader at an ETC station/checkpoint/toll booth, upon which the self-declared vehicle occupancy information is obtained by the ETC system. In some embodiments, e-plate 230 can also provide the stored toll account information along with the self-declared vehicle occupancy information to the ETC reader. For example, when the vehicle equipped with e-plate system 200 travels through an ETC toll booth, an ETC reader can read both the toll account information and the self-declared vehicle occupancy information stored on e-plate system 200. The ETC system can identify a toll account associated with the vehicle based on the obtained account information. In addition, the ETC system can debit from the toll account with a toll charge that is determined based on the obtained self-declared vehicle occupancy information. In some embodiments, the ETC reader can gain access to the memory on e-plate 230 based on one or more security keys. For example, in some embodiments, the ETC reader is required to provide one or more security keys to access the part of the memory on e-plate 230 which stores the toll account information.

Figure 5:
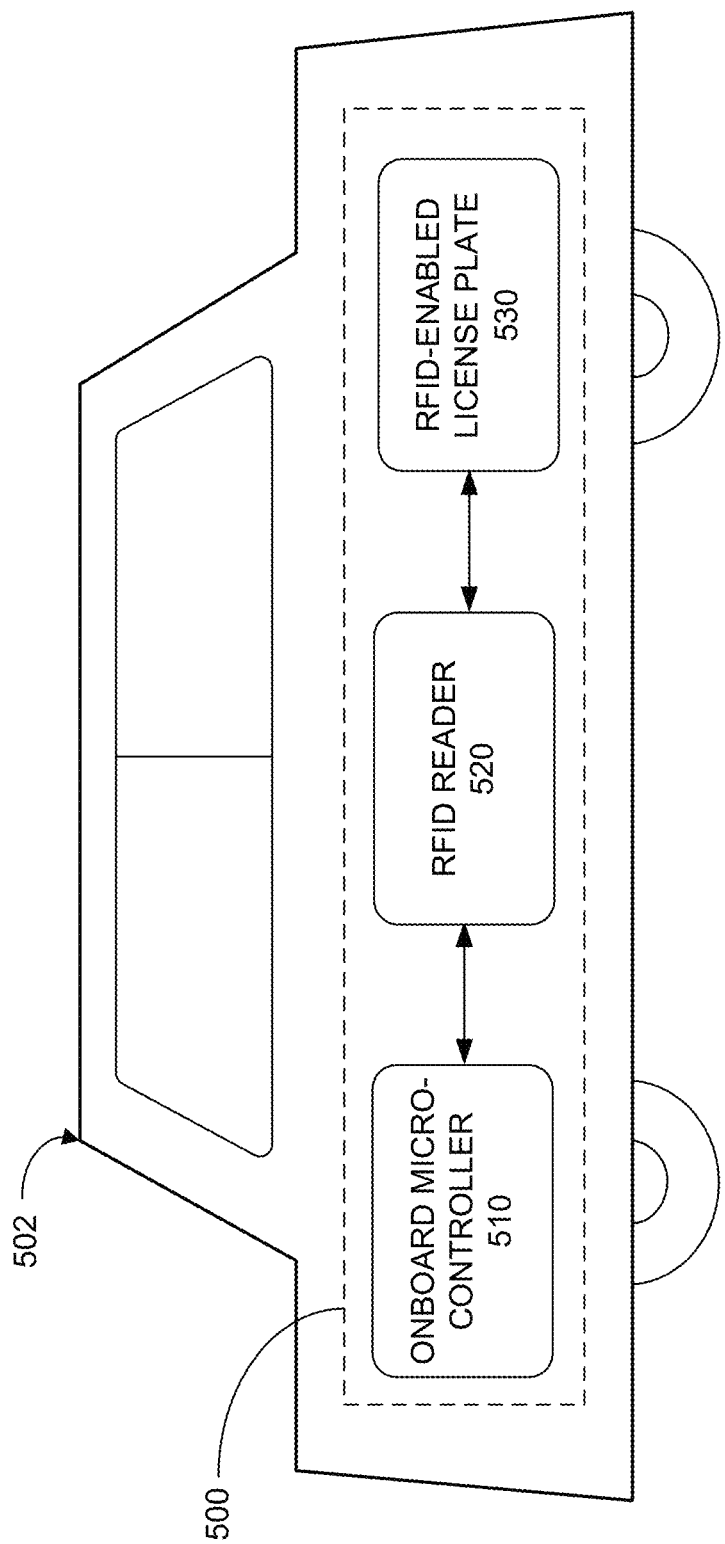
FIG. 5 shows a block diagram of an exemplary e-plate validation system on a vehicle in accordance with one embodiment described herein.

FIG. 5 shows a block diagram of an exemplary e-plate validation system 500 on a vehicle 502 in accordance with one embodiment described herein. As shown in FIG. 5, e-plate validation system 500 includes an onboard microcontroller (or computer) 510, an RFID reader 520, and a RFID-enabled license plate 530, which are coupled to each other by wired connections, wireless connections, or a combination of both. Note that RFID-enabled license plate 530 can be implemented based on the embodiment described with respect to FIG. 3. In various embodiments, RFID reader 520 is an "onboard" RFID reader located within vehicle 502 registered under RFID-enabled license plate 530. RFID-enabled license plate 530 can be installed on vehicle 502 as the front license plate, as the back license plate, or as both the front and the back license plates. In one embodiment, RFID-enabled license plate 530 can be associated with a unique identifier for uniquely identifying vehicle 502, which is stored on an RFID tag embedded within RFID-enabled license plate 500.

In some embodiments, RFID-enabled license plate 530 includes a memory (not shown). According to one exemplary embodiment, the memory can store one or more identifiers that can be used (e.g., by onboard microcontroller 510 or the RFID reader 520) to verify whether RFID-enabled license plate 530 is a valid e-plate for vehicle 502. In some embodiments, the memory can store additional data including, but not limited to, account information for a toll account associated with vehicle 502 and occupancy information (e.g., a number of occupants) for vehicle 502. In some embodiments, in addition to communicating with RFID reader 520, RFID-enabled license plate 530 is configured to also communicate with RFID-enabled ETC readers associated with one or more ETC systems. In various embodiments, an ETC reader can access the account information and occupancy information stored in the memory of RFID-enabled license plate 530. In one exemplary embodiment, a toll charge that is assessed based on the current occupancy information can be debited from the toll account associated with vehicle 502.

Although the embodiment of FIG. 5 describes the RFID-enabled license plate as part of the e-plate validation system, other embodiments of the disclosed e-plate validation system can include the RFID reader and the onboard microcontroller without the RFID-enabled license plate. In these embodiments, the e-plate validation system interacts with an RFID-enabled license plate wirelessly.

In various embodiments, onboard microcontroller 510 is implemented as an onboard computer system for vehicle 502. Hence, in these embodiments, onboard microcontroller 510 can be configured to control (e.g., enable and disable) one or more vehicle functions. For example, onboard microcontroller 510 can trigger an alarm on vehicle 502. As another example, onboard microcontroller 510 can enable and disable an immobilizer function that, when enabled, would prevent vehicle 502 from starting.

In various embodiments, onboard microcontroller 510 is configured to communicate with RFID reader 520. Onboard microcontroller 510 can be coupled to RFID reader 520 through a wired or wireless connection. In some embodiments, onboard microcontroller 520 is configured to control one or more functions of the RFID reader 520 including, but not limited to, triggering RFID reader 520 to interrogate RFID-enabled license plate 530. In various embodiments, onboard microcontroller 510 can be configured to trigger RFID reader 520 to interrogate RFID-enabled license plate 530 in response to one or more events such as unlocking of vehicle 502 and attempting to start vehicle 502.

In some embodiments, onboard microcontroller 510 can include an input/output (I/O) unit. For example, onboard microcontroller 510 can include a touchscreen that displays an HOV lane declaration switch graphic user interface (GUI) such as the GUI 240 illustrated in FIG. 2. In various embodiments, onboard microcontroller 510 is configured to transmit one or more commands to RFID reader 520 that cause RFID reader 520 to write user self-declared occupancy information of vehicle 502 entered via the input/output (I/O) unit to RFID-enabled license plate 530 in a manner similar to the self-declaring e-plate system 200 described above.

In some embodiments, RFID reader 520 can be positioned on vehicle 502 at a location within an effective read range of the RFID tag within RFID-enabled license plate 530. Notably, if the RFID tag within RFID-enabled license plate 530 is based on an UHF transmission, the effective read range is typically longer than 3 feet and up to 37 feet. In some embodiments, RFID reader 520 can be implemented according to RF reader 102 described with respect to FIG. 1. In various embodiments, RFID reader 520 can be a multi-purpose RFID reader which can perform other RFID read functions such as for locking and unlocking vehicle 502.

In some embodiments, RFID reader 520 is configured to interrogate RFID-enabled license plate 530. For example, RFID reader 520 can be configured to interrogate RFID-enabled license plate 530 in response to one or more commands received from onboard microcontroller 510. Alternatively, RFID reader 520 can be configured to interrogate RFID-enabled license plate 530 periodically and/or according to a dynamic or fixed schedule. In some embodiments, RFID reader 520 is unable to successfully interrogate RFID-enabled license plate 530, e.g., when the e-plate is missing from vehicle 502. In these embodiments, RFID reader 520 can be configured to transmit a signal to onboard microcontroller 510 indicating that RFID-enabled license plate 530 is not present on vehicle 502.

Alternatively, if RFID reader 520 is able to successfully interrogate RFID-enabled license plate 530, for example, in response to a scheduled interrogation, RFID reader 520 can receive one or more identifiers from RFID-enabled license plate 530. In some embodiments, RFID reader 520 is configured to transmit the one or more identifiers to onboard microcontroller 510. Alternatively, in some embodiments, RFID reader 520 is configured to directly verify whether RFID-enabled license plate 530 is a valid e-plate of vehicle 502 based on the one or more identifiers received from RFID-enabled license plate 530. In these embodiments, RFID reader 520 can be configured to transmit a signal to onboard microcontroller 510 indicating whether RFID-enabled license plate 530 has been successfully verified as a valid e-plate for vehicle 502.

In various embodiments, onboard microcontroller 510 is configured to determine whether RFID-enabled license plate 530 is present on (e.g., attached to) vehicle 502. For example, onboard microcontroller 510 can receive a signal from RFID reader 520 indicating whether RFID reader 520 is able to successfully interrogate RFID-enabled license plate 530. In one particular embodiment, onboard microcontroller 510 receives a signal from RFID reader 520 indicating that RFID-enabled license plate 530 is not present on vehicle 502 if RFID reader 520 is not able to successfully interrogate RFID-enabled license plate 530. This condition can be caused by if RFID-enabled license plate 530 is stolen or has accidentally fallen off vehicle 502. According to one exemplary embodiment, in response to receiving the signal indicating that RFID-enabled license plate 530 is not present on vehicle 502, onboard microcontroller 510 is configured to enable one or more vehicle functions, for example, an alarm function which sets off an alarm siren and/or an immobilizer function that, when enabled, prevents vehicle 502 from starting. In other embodiments, in response to receiving the signal indicating that RFID-enabled license plate 530 is not present on vehicle 502, onboard microcontroller 510 is configured to enable a hazard light function (e.g., causing the hazard lights to be continuously on) and disable the immobilizer function that, when disabled, does not prevent vehicle 502 from starting.

After the alarm has been triggered as a result of detecting that RFID-enabled license plate 530 is not present on vehicle 502, in some embodiments, onboard microcontroller 510 is configured to turn off the alarm, e.g., after a user enters a correct key code or pushes a secret reset button on vehicle 502. In some embodiments, when an e-plate is reinstalled onto vehicle 502 which is subsequently detected by onboard microcontroller 510, onboard microcontroller 510 is configured to turn off the alarm.

In some embodiments, if RFID reader 520 is able to successfully interrogate RFID-enabled license plate 530, onboard microcontroller 510 receives, from RFID reader 520, one or more identifiers read from RFID-enabled license plate 530. As such, in some embodiments, onboard microcontroller 510 is configured to verify whether RFID-enabled license plate 530 is a valid e-plate for vehicle 502 based on the one or more identifiers received from RFID reader 520. For example, onboard microcontroller 510 can compare the one or more identifiers received from RFID reader 520 with one or more stored identifiers corresponding to a valid e-plate for vehicle 502. The valid identifiers for vehicle 502 can be stored directly in a memory of onboard microcontroller 510 or the valid identifiers can be stored in a memory within RFID reader 520 and transmitted from RFID reader 520 to onboard microcontroller 510 at the request of onboard microcontroller 510. In some embodiments, RFID-enabled license plate 530 is verified by onboard microcontroller 510 if the received identifiers match the stored identifiers corresponding to the valid e-plate for vehicle 502.

In some embodiments, after verifying the received one or more identifiers, onboard microcontroller 510 is configured to perform additional steps to further validate the registration information associated vehicle 502. For example, in one embodiment, after determining that the received identifiers read from RFID-enabled license plate 530 matches the stored identifiers on onboard microcontroller 510, onboard microcontroller 510 next accesses an external server containing up-to-date vehicle registration information based on the verified identifiers.

As mentioned above, in some embodiments, RFID reader 520 is configured to directly verify if RFID-enabled license plate 530 is a valid e-plate for vehicle 502. For example, RFID reader 520 can perform the comparison of the one or more identifiers read from RFID-enabled license plate 530 and the stored identifiers of the valid e-plate for vehicle 502. The valid identifiers for vehicle 502 can be stored directly in a memory within RFID reader 520 or the valid identifiers can be stored in a memory of onboard microcontroller 510 and transmitted from onboard microcontroller 510 to RFID reader 520 at the request of RFID reader 520. Upon completing the identifier verification, RFID reader 520 can transmit a signal to onboard microcontroller 510 indicating whether RFID-enabled license plate 530 has been successfully verified as a valid e-plate for vehicle 502. As a result, onboard microcontroller 510 receives, from RFID reader 520, the signal indicating whether RFID-enabled license plate 530 has been successfully verified.

In some embodiments, after RFID-enabled license plate 530 has been verified either by onboard microcontroller 510 or by RFID reader 520 which transmits the verification results to onboard microcontroller 510, onboard microcontroller 510 is configured to control (e.g., by enabling or disabling) one or more vehicle functions based on whether RFID-enabled license plate 530 has been successfully verified as a valid e-plate for vehicle 502. These vehicle functions can include, but are not limited to, enabling/disabling an immobilizer of vehicle 502 and triggering an alarm. For example, if the verification of the one or more identifiers has failed, onboard microcontroller 510 can enable an immobilizer of vehicle 502 to prevent vehicle 502 from starting and/or triggering an alarm siren. However, if the verification of the one or more identifiers is successful, onboard microcontroller 510 can disable the immobilizer of vehicle 502.

After the alarm has been triggered as a result of the failed identifier verification, in some embodiments, onboard microcontroller 510 is configured to turn off the alarm, e.g., after a user enters a correct key code or pushes a secret reset button on vehicle 502. In some embodiments, when a correct e-plate is reinstalled onto vehicle 502 which is subsequently detected by onboard microcontroller 510, onboard microcontroller 510 is configured to turn off the alarm.

According to one exemplary embodiment, RFID-enabled license plate 530 can also be used in one or more account management applications. For example, RFID enabled license plate 530 can be used to track a vehicle for purposes of electronic tolling, parking access, and border control. At least some applications for the RFID-enabled license plate 530 are described in U.S. patent application Ser. Nos. 14/459,299 and 14/250,356, the disclosures of which are incorporated herein by reference in their respective entirety.

In various embodiments, access (e.g., by RFID reader 520) to the memory of RFID-enabled license plate 530 can be granted based on a security key. Accordingly, in various embodiments, to successfully interrogate RFID-enabled license plate 530, RFID reader 520 and/or one or more ETC readers can be required to provide a valid security key to RFID-enabled license plate 530. The provision of secure identification solutions is described in U.S. Pat. Nos. 7,081, 819, 7,671,746, 8,237,568, 8,322,044, and 8,004,410, the disclosures of which are incorporated by reference herein in their respective entirety.

In some embodiments, RFID-enabled license plate 530 can include two or more RFID modules configured to interface with corresponding RFID systems at different frequencies. Multi-frequency RFID tags are described in Reissued U.S. Pat. Nos. RE 43,355 and RE 44,691, the disclosures of which are incorporated by reference herein in their respective entirety. For example, in one exemplary embodiment, RFID-enabled license plate 530 is configured to communicate with RFID reader 520 using a high frequency (HF) band (e.g., 13.56 megahertz (MHz)). In addition, RFID-enabled license plate 530 is also configured to communicate with an ETC reader using an ultra-high frequency (UHF) band (e.g., 915 MHz or 2.45 gigahertz (GHz)).

In some embodiments, RFID-enabled license plate 530 can be further configured to perform one or more account management functions. According to one exemplary embodiment, RFID-enabled license plate 530 can operate at one frequency (e.g., HF) to interact with an electronic payment system and at a different frequency to interact with an ETC system. For example, RFID-enabled license plate 530 can interact with a near-field communication (NFC) enabled device to provide sufficient information for the NFC enabled device to complete an electronic payment transaction to replenish a toll account of vehicle 502. In addition, RFID-enabled license plate 530 can also interact with an ETC reader to provide sufficient information for the ETC system to apply a toll charge to the toll account. Various account management applications for RFID-enabled license plate 530 are described in U.S. Pat. No. 14/459,299 and U.S. patent application Ser. No. 14/459,299, the disclosures of which are incorporated herein by reference in their entirety.

A person having ordinary skill in the art can appreciate that onboard microcontroller 510, RFID reader 520, and RFID-enabled license plate 530 can be coupled via wired and/or wireless connections without departing from the scope of the present disclosure. As such, in various embodiments, onboard microcontroller 510, RFID reader 520, and RFID-enabled license plate 530 can be installed in separate locations on a vehicle. For example, onboard microcontroller 510 and RFID reader 520 can be installed in the cabin of vehicle 502 while RFID-enabled license plate 530 is placed on the exterior of vehicle 502.

Figure 6:
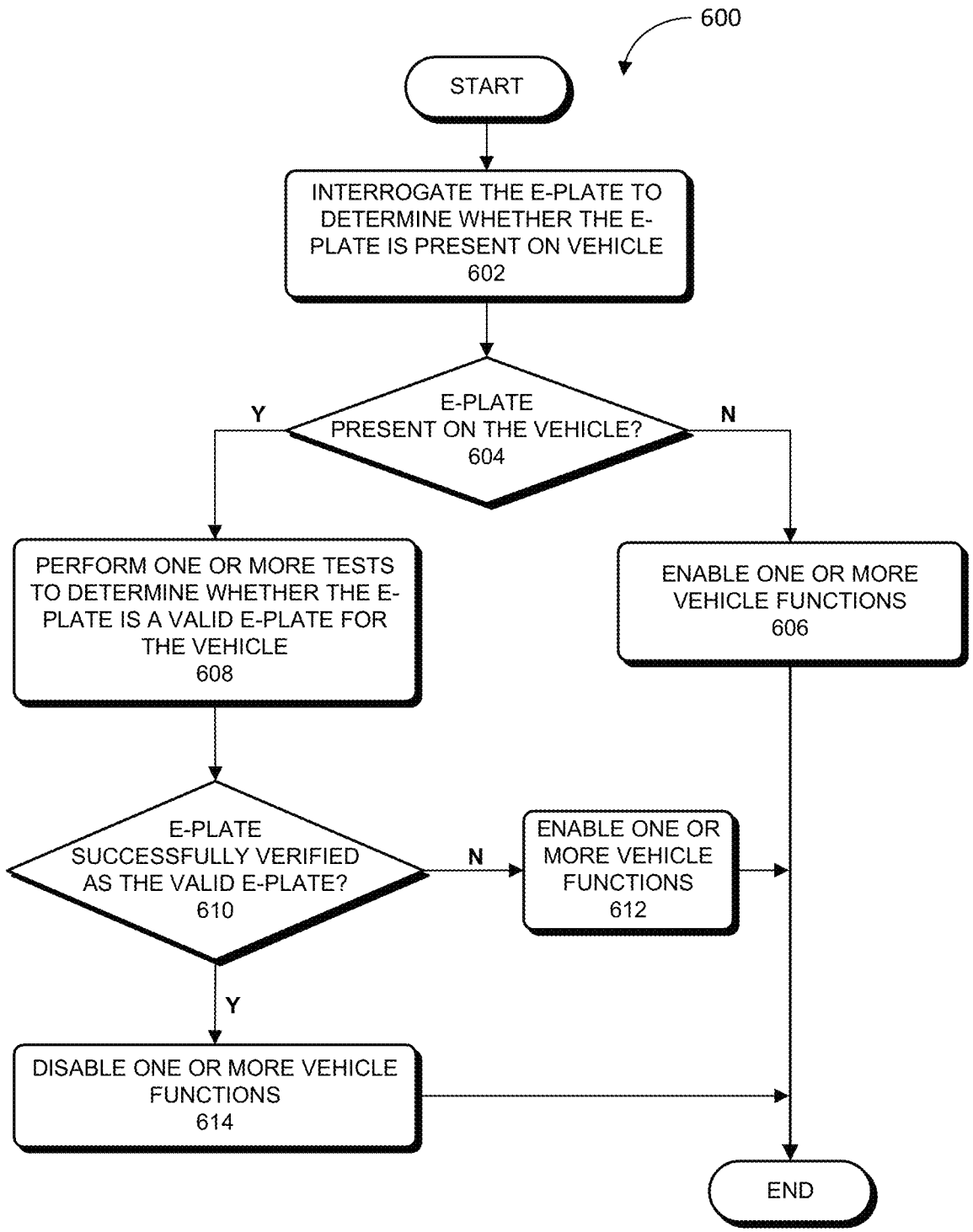
FIG. 6 presents a flowchart illustrating a process for automatically validating an e-plate in accordance with one embodiment described herein.

FIG. 6 presents a flowchart illustrating a process 600 for automatically validating an e-plate in accordance with one embodiment described herein. In the discussion below, process 600 is described to be performed by e-plate validation system 500.

As shown in FIG. 6, the process begins when e-plate validation system 500 interrogates RFID-enabled license plate 530 (i.e., the e-plate) to determine whether the e-plate is present on vehicle 502 (step 602). In some embodiments, in response to one or more events (e.g., unlocking the vehicle or attempting to start the vehicle), onboard microcontroller 510 transmits one or more commands to RFID reader 520 which subsequently trigger RFID reader 520 to interrogate the e-plate. Alternatively, in some embodiments, RFID reader 520 can attempt to interrogate the e-plate 130 periodically and/or according to a dynamic or fixed schedule.

Next, e-plate validation system 500 determines if the e-plate is present on vehicle 502 (step 604). If e-plate validation system 500 determines that the e-plate is not present on the vehicle, e-plate validation system 500 then enables one or more vehicle functions (step 606). For example, in one embodiment, if RFID reader 520 is unable to successfully interrogate the e-plate, RFID reader 520 transmits a signal to onboard microcontroller 510 to indicate that the e-plate is not present on the vehicle. In one embodiment, in response to the indication from RFID reader 520 that the e-plate is not present on the vehicle, onboard microcontroller 510 enables one or more vehicle functions. For example, onboard microcontroller 510 can trigger an alarm function on the vehicle that sets off an alarm (e.g., an alarm siren or a hazard light). As another example, onboard microcontroller 510 can enable an immobilizer function that, when enabled, prevents the vehicle from starting.

On the other hand, if e-plate validation system 500 determines that the e-plate is present on the vehicle, e-plate validation system 500 next performs one or more tests to determine whether the e-plate is a valid e-plate for the vehicle (step 608). For example, in some embodiments, onboard microcontroller 510 receives one or more identifiers that RFID reader 520 has read from the e-plate and compares the one or more identifiers with one or more stored identifiers that correspond to a valid e-plate of the vehicle. Alternatively, in some embodiments, RFID reader 520 can verify whether the e-plate is a valid e-plate for the vehicle, e.g., by comparing the one or more identifiers read from the e-plate with one or more stored identifiers of the valid e-plate of the vehicle. RFID reader 520 can subsequently transmit a signal to onboard microcontroller 510 indicating whether the one or more received identifiers correspond to the valid e-plate of the vehicle.

Continuing referring to FIG. 6, e-plate validation system 500 then determines if the e-plate is successfully verified as a valid e-plate for the vehicle (step 610). If e-plate validation system 500 determines that the e-plate is not successfully verified as a valid e-plate for the vehicle, e-plate validation system 500 enables one or more vehicle functions (step 612). For example, e-plate validation system 500 can enable an immobilizer that prevents the vehicle from starting and/or trigger an alarm siren. Alternatively, if e-plate validation system 500 determines that the e-plate is successfully verified as a valid e-plate for the vehicle, e-plate validation system 500 disables the one or more vehicle functions (step 614). For example, e-plate validation system 500 can disable the immobilizer. As such, if the e-plate is determined to be a valid e-plate for the vehicle, the vehicle will not be prevented from starting by the immobilizer and no alarm will be triggered.

A person having ordinary skill in the art can appreciate that e-plate validation system 500 can be configured to perform process 600 periodically, according to a dynamic or a fixed schedule, and/or in response to one or more events (e.g., unlocking the vehicle, attempting to start the vehicle) without departing from the scope of the present disclosure.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures can be implemented as, for example, but not limited to, software and/or firmware on a processor, ASIC/FPGA/DSP, or dedicated hardware. Also, the features and attributes of the specific example embodiments disclosed above can be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of receiver devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable storage medium or non-transitory processor-readable storage medium. The steps of a method or algorithm disclosed herein can be embodied in processor-executable instructions that can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable storage media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable storage medium and/or computer-readable storage medium, which can be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed:

1. A self-declaring electronic license plate (e-plate) system for a vehicle, comprising:
   an input device located inside the vehicle;
   a radio frequency identification (RFID) reader coupled to the input device; and
   an RFID-enabled license plate;
   wherein:
      the input device is configured to receive vehicle occupancy information and trigger the RFID reader to write the received vehicle occupancy information to the RFID-enabled license plate in response to receiving the vehicle occupancy information;
      the RFID reader is configured to write at least a portion of the received vehicle occupancy information that includes a number of occupants inside the vehicle, self-declared by a user, to the RFID-enabled license plate; and
      the RFID-enabled license plate is configured to provide the at least a portion of the received vehicle occupancy information to an electronic toll collection (ETC) reader.

2. The e-plate system of claim 1, wherein the RFID-enabled license plate comprises a first RFID module configured to operate using a first frequency band.

3. The e-plate system of claim 2, wherein the RFID-enabled license plate is configured to communicate with the RFID reader via the first RFID module using the first frequency band.

4. The e-plate system of claim 2, wherein the first frequency band comprises a high frequency (HF) frequency band.

5. The e-plate system of claim 2, wherein the RFID-enabled license plate further comprises a second RFID module configured to operate using a second frequency band.

6. The e-plate system of claim 5, wherein the RFID-enabled license plate is configured to communicate with the ETC reader via the second RFID module using the second frequency band.

7. The e-plate system of claim 5, wherein the second frequency band comprises an ultra-high frequency (UHF) frequency band.

8. The e-plate system of claim 1, wherein the input device includes a keypad configured to receive the vehicle occupancy information directly from a user.

9. The e-plate system of claim 1, wherein the input device is integrated with an onboard computer system and is configured to receive the vehicle occupancy information input by a user via a user interface of the onboard computer system.

10. The e-plate system of claim 1, wherein the RFID-enabled license plate is further configured to store account information for a toll account associated with a vehicle.

11. The e-plate system of claim 10, wherein the RFID-enabled license plate is configured to provide at least a portion of the account information to the ETC reader, and wherein the ETC reader is configured to identify the toll account associated with the vehicle based at least in part on the account information, and debit a toll charge determined based at least in part on the received vehicle occupancy information.

12. The e-plate system of claim 10, wherein the RFID-enabled license plate is configured to interact with a near-field communication (NFC) enabled device including by providing at least a portion of the account information to the NFC-enabled device, and wherein the NFC-enabled device is configured to complete an electronic payment transaction to replenish the toll account based at least in part on the received account information.

13. The e-plate system of claim 1, wherein at least one of the writing of the received occupancy information to the RFID-enabled license plate and the provision of the received occupancy information to the ETC reader by the RFID-enabled license plate includes gaining access to a memory of the RFID-enabled license plate based on one or more security keys.

14. The e-plate system of claim 1, wherein the RFID reader is a multi-purpose RFID reader configured to perform one or more functions other than writing to the RFID-enabled license plate.

15. The e-plate system of claim 1, wherein the one or more functions include locking and unlocking the vehicle.

16. The e-plate system of claim 1, wherein the RFID reader is a dedicated RFID reader configured specifically for communicating with the RFID-enabled license plate.

17. The e-plate system of claim 1, wherein the input device and the RFID reader are integrated as a single electronic module.

18. A method for providing vehicle occupancy information to an electronic toll collection (ETC) reader, comprising:

receiving, at an input device located inside the vehicle, current occupancy information for a vehicle;

writing the received current occupancy information including a number of occupants entered through the input device by a user, using a radio frequency identification (RFID) reader, to an RFID-enabled license plate; and providing, by the RFID-enabled license plate, the received current occupancy information to the ETC reader.

19. The method of claim 18, wherein prior to writing the received current occupancy information, the method further comprises sending a signal from the input device to the RFID reader to trigger the writing operation by the RFID reader.

20. The method of claim 18, wherein the RFID-enabled license plate is further configured to store account information for a toll account associated with the vehicle.

21. The method of claim 20, wherein the RFID-enabled license plate is configured to provide at least a portion of the account information to the ETC reader, and wherein the ETC reader is configured to identify the toll account associated with the vehicle based at least in part on the account information, and debit a toll charge determined based at least in part on the received occupancy information.

22. The method of claim 20, wherein the RFID-enabled license plate is further configured to interact with a near-field communication (NFC) enabled device including by providing at least a portion of the account information to the NFC-enabled device, and wherein the NFC-enabled device is configured to complete an electronic payment transaction to replenish the toll account based at least in part on the account information.

23. The method of claim 18, wherein the RFID-enabled license plate is configured to communicate with the RFID reader using a first frequency band and the ETC reader using a second frequency band.

24. The method of claim 23, wherein the first frequency band comprises a high frequency (HF) frequency band, and wherein the second frequency band comprises an ultra-high frequency (UHF) frequency band.

25. The method of claim 18, wherein at least one of the writing of the current occupancy information to the RFID-enabled license plate and the provision of current occupancy information to the ETC reader by the RFID-enabled license plate includes gaining access to a memory of the RFID-enabled license plate based on one or more security keys.

* * * * *